(12) United States Patent
Oshima

(10) Patent No.: US 12,199,795 B2
(45) Date of Patent: Jan. 14, 2025

(54) IMAGE PROCESSING DEVICE AND NON-TRANSITORY COMPUTER READABLE MEDIUM STORING PROGRAM

(71) Applicant: FUJIFILM Business Innovation Corp., Tokyo (JP)

(72) Inventor: Akihide Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 683 days.

(21) Appl. No.: 17/153,885

(22) Filed: Jan. 21, 2021

(65) Prior Publication Data

US 2022/0086024 A1 Mar. 17, 2022

(30) Foreign Application Priority Data

Sep. 15, 2020 (JP) .................................. 2020-154397

(51) Int. Cl.
*H04L 12/46* (2006.01)
*H04L 9/40* (2022.01)
*H04L 41/0806* (2022.01)
*H04L 41/0816* (2022.01)

(52) U.S. Cl.
CPC ........ *H04L 12/465* (2013.01); *H04L 41/0806* (2013.01); *H04L 41/0816* (2013.01); *H04L 63/0869* (2013.01)

(58) Field of Classification Search
None
See application file for complete search history.

(56) References Cited

U.S. PATENT DOCUMENTS

| 8,934,116 B2 | 1/2015 | Umekage et al. | |
| 2003/0101289 A1* | 5/2003 | Alikberov | H04N 1/00973 |
| | | | 719/321 |
| 2007/0041043 A1* | 2/2007 | Murakami | H04N 1/32502 |
| | | | 358/1.15 |
| 2008/0036695 A1* | 2/2008 | Murai | G09G 3/2092 |
| | | | 345/2.3 |
| 2009/0285221 A1* | 11/2009 | Ito | H04L 41/0803 |
| | | | 370/395.53 |
| 2017/0214824 A1* | 7/2017 | Ooba | H04N 1/00408 |
| 2017/0366701 A1* | 12/2017 | Ooba | H04N 1/00076 |

FOREIGN PATENT DOCUMENTS

| JP | 2002204247 | 7/2002 |
| JP | 2005101722 | 4/2005 |
| JP | 2009265778 | 11/2009 |
| JP | 2016054419 | 4/2016 |
| JP | 2017169061 | 9/2017 |

OTHER PUBLICATIONS

"Notice of Reasons for Refusal of Japan Counterpart Application", issued on Jun. 11, 2024, with English translation thereof, p. 1-p. 5.
"Notice of Reasons for Refusal of Japan Counterpart Application", issued on Oct. 15, 2024, with English translation thereof, p. 1-p. 5.

* cited by examiner

*Primary Examiner* — Srinivasa R Reddivalam
(74) *Attorney, Agent, or Firm* — JCIPRNET

(57) ABSTRACT

An image processing device has a processor configured to form a virtual network, to which a function of the image processing device is allocated, and provide the function to another device connected to the virtual network.

11 Claims, 3 Drawing Sheets

FIG. 3

| VLAN ID | 1 | 2 | 3 |
|---|---|---|---|
| CONFERENCE TITLE | VLAN CONFERENCE | SDN MEETING | TAG ARRANGEMENT |
| OWNER | A | B | C |
| MAIL ADDRESS | AAA@jp.com | NONE | NONE |
| DATE | 2/2/2020 | 2/20/2020 | 12/12/2020 |
| START TIME | 10:00 | 13:00 | 8:00 |
| END TIME | 12:00 | 19:00 | 17:00 |
| PARTICIPANT | THREE PERSONS | NINE PERSONS | SIX PERSONS |
| PRINT | USE | NOT USE | ONLY BLACK AND WHITE |
| SCAN | USE | USE | USE |
| FAX | USE | NOT USE | ONLY BLACK AND WHITE |
| HDD STORAGE | USE | USE | USE |

IMAGE PROCESSING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-154397 filed Sep. 15, 2020.

BACKGROUND

(i) Technical Field

The present invention relates to an image processing device and a non-transitory computer readable medium storing a program.

(ii) Related Art

A technique for providing a virtual network is known.

JP2002-204247A describes a system that allows registration of user information required for connection to a network, in which a VLAN in constructed, to be performed on a user's initiative.

SUMMARY

Incidentally, there is a case where an image processing device that provides a virtual network is shared by a plurality of users. In a case where the virtual network is shared by a plurality of users, leakage of information, erroneous transmission of information, or the like may occur at the time of sharing, and security of information may be degraded.

Aspects of non-limiting embodiments of the present disclosure relate to an image processing device and a non-transitory computer readable medium storing a program that, in a case where an image processing device that provides a virtual network is used, improve security of information when the virtual network is used compared to a case where a function of the image processing device to be provided through the virtual network is not limited.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing device including a processor configured to form a virtual network, to which a function of the image processing device is allocated, and provide the function to another device connected to the virtual network.

BRIEF DESCRIPTION OF THE DRAWINGS

Exemplary embodiment(s) of the present invention will be described in detail based on the following figures, wherein:

FIG. 3 is a diagram showing reservation registration information of a virtual network.

DETAILED DESCRIPTION

Figure 1:
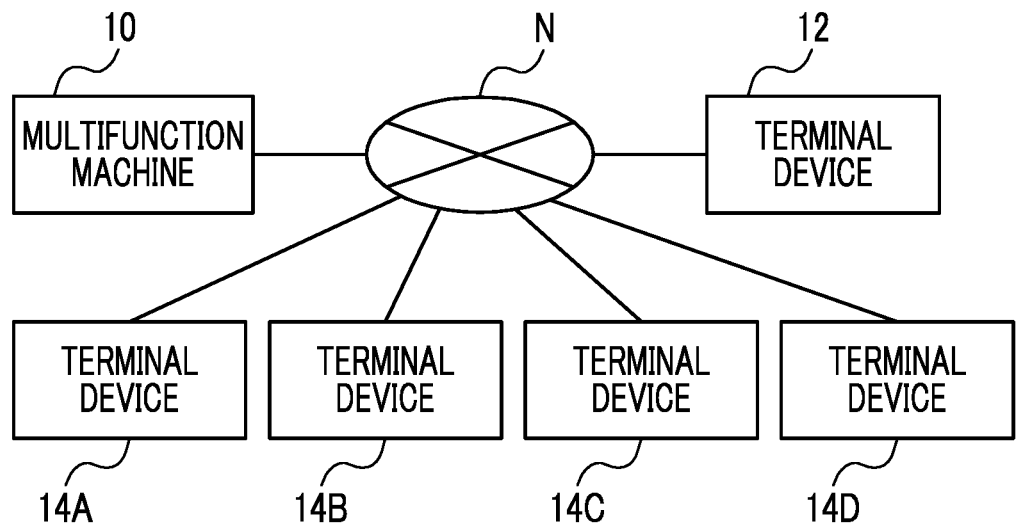
FIG. 1 is a block diagram showing the configuration of an information processing system according to an exemplary embodiment.

An information processing system according to an exemplary embodiment will be described referring to FIG. 1. FIG. 1 shows an example of the configuration of the information processing system according to the exemplary embodiment. The information processing system includes, for example, a multifunction machine 10 and one or a plurality of terminal devices. The multifunction machine 10 and each terminal device can perform communication with other devices through a communication path N. The communication path N is, for example, the Internet or other networks. In the example shown in FIG. 1, although terminal devices 12, 14A, 14B, 14C, and 14D are included in the information processing system, this is just an example, and one or a plurality of terminal devices should be included in the information processing system.

The multifunction machine 10 is an example of the image processing device according to the exemplary embodiment, and has at least a function of image processing. The multifunction machine 10 may include a printer and a scanner, and may function as an image forming device. Here, as an example, the multifunction machine 10 has a print function, a scan function, a copy function, and a facsimile function. One or a plurality of virtual networks are formed by the multifunction machine 10.

The multifunction machine 10 is just an example of the image processing device according to the exemplary embodiment. A device that has a function of forming a virtual network other than the multifunction machine 10 may be included as an example of the image processing device in the information processing system. For example, a scanner, a printer, or a facsimile device may be included in the information processing system, and a virtual network may be formed by such devices. Alternatively, a plurality of image processing devices may be included in the information processing system.

For example, the multifunction machine 10 and the terminal devices 12, 14A, 14B, 14C, and 14D are connected to an identical network (for example, a local area network (LAN)).

The multifunction machine 10 forms a virtual local area network (VLAN) as an example of a virtual network in a LAN where the multifunction machine is present. In more detail, the multifunction machine 10 compatible with the VLAN and a switch or a router compatible with the VLAN are cooperated to form the VLAN. Though will be described below referring to FIG. 3, for example, VLAN-1, VLAN-2, and VLAN-3 are formed.

A function of the multifunction machine 10 is allocated to the virtual network, and a user can use the function allocated to the virtual network using the virtual network. For example, a plurality of virtual networks are formed, and, each virtual network is allocated with functions to be provided independently through the virtual network. The user is permitted to use the function allocated to the virtual network, which is permitted to be used, through the virtual network.

Figure 2:
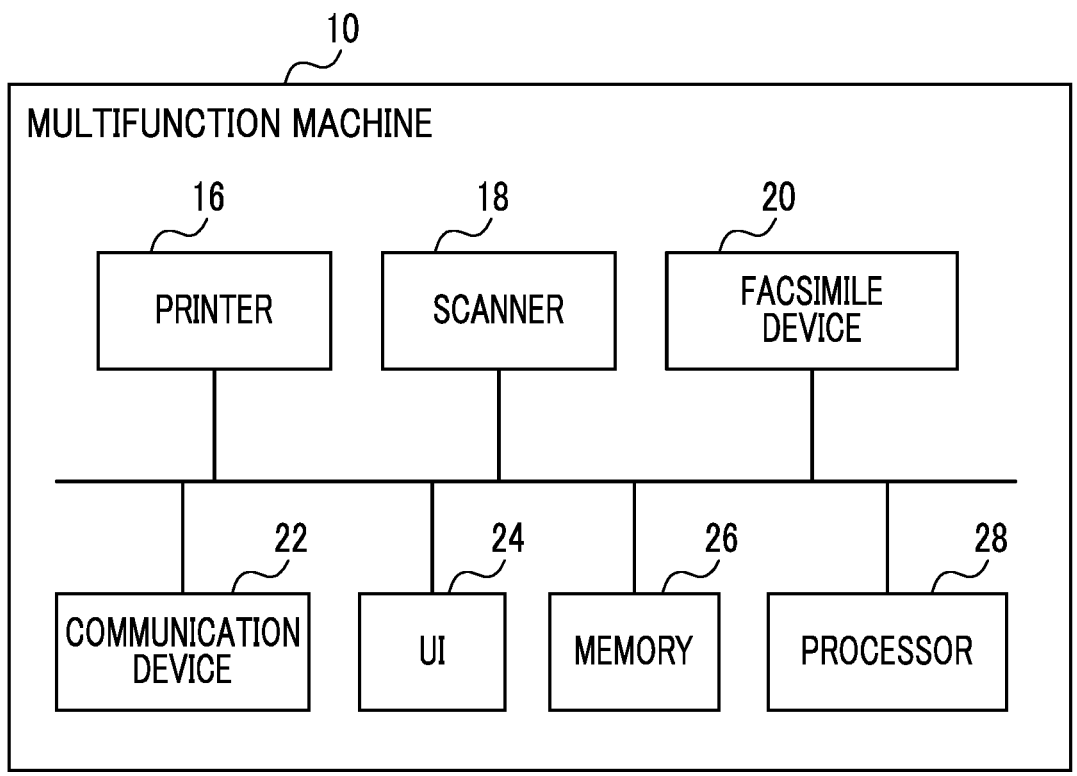
FIG. 2 is a block diagram showing the configuration of a multifunction machine.

Hereinafter, the configuration of the multifunction machine 10 will be described referring to FIG. 2. FIG. 2 shows an example of the configuration of the multifunction machine 10.

The multifunction machine 10 includes, for example, a printer 16, a scanner 18, a facsimile device 20, a communication device 22, a UI 24, a memory 26, and a processor 28.

The printer 16 is a device that prints an image on a recording medium, such as a sheet. The scanner 18 is a device that generates image data by reading a recording medium, such as a sheet. The facsimile device 20 is a device that transmits image data to another facsimile device by facsimile and receives image data sent from another facsimile device by facsimile.

The communication device 22 is a communication interface having a communication chip, a communication circuit, or the like, and has a function of transmitting information to another device and a function of receiving information transmitted from another device. Communication through the communication device 22 may be wired communication or may be wireless communication.

The UI 24 is a user interface and includes a display and an operation device. The display is a liquid crystal display, an EL display, or the like. The operation device is a keyboard, input keys, an operation panel, or the like. The UI 24 may be a UI, such as a touch panel including both the display and the operation device.

The memory 26 is a device that constitutes one or a plurality of storage areas to store various kinds of information. The memory 26 is, for example, a hard disk drive, various memories (for example, a RAM, a DRAM, and a ROM), other storage devices (for example, an optical disc), or a combination thereof. One or a plurality of memories 26 are included in the multifunction machine 10.

The processor 28 is configured to control the operation of each unit of the multifunction machine 10. The processor 28 may have a memory. For example, the processor 28 forms a virtual network, such as a VLAN. Furthermore, the processor 28 allocates a function of the multifunction machine 10 to the virtual network.

The terminal device 12 and the terminal devices 14A, 14B, 14C, and 14D are, for example, a personal computer (hereinafter, referred to as a "PC"), a tablet PC, a smartphone, or a mobile phone, and includes a communication device, a UI, a memory, and a processor.

The terminal device 12 is used by, for example, a user (for example, an owner of a conference, or the like) who makes a reservation of a virtual network that is provided by the multifunction machine 10. The terminal devices 14A, 14B, 14C, and 14D are used by users who actually use the reserved virtual network. Information regarding the reservation of the virtual network is stored in the memory 26 of the multifunction machine 10.

Hereinafter, processing by the information processing system according to the exemplary embodiment will be described in detail. In the following description, as an example, a reservation of a VLAN is registered to perform a conference, and the VLAN is provided.

First, the owner of the conference (for example, a user or the like who is authorized to set the conference) registers the reservation of the VLAN in the multifunction machine 10 through a Web service that is provided by the multifunction machine 10, an operation panel that is provided in the multifunction machine 10, or the like. For example, the owner may access the Web service using the terminal device 12 to register the reservation of the VLAN. Alternatively, the owner may operate the operation panel to register the reservation of the VLAN.

For example, the owner sets, at the Web service or the operation panel, conference identification information (for example, a title) for identifying the conference, information (for example, a name) for identifying the owner, an e-mail address of the owner, date on which the VLAN is used, a start time of the use, an end time of the use, and the number of participants. Furthermore, the owner may set propriety of using the functions (for example, the print function, the scan function, and the like) of the multifunction machine 10 through the VLAN.

The processor 28 of the multifunction machine 10 receives information indicating the content of the above-described setting, stores the content of the setting in the memory 26 of the multifunction machine 10, and registers the above-described reservation in the multifunction machine 10.

The processor 28 individually allocates identification information (for example, VLAN-ID) of the virtual network to each registration of a reservation (for example, to each conference).

At the time of the registration of the reservation of the virtual network, information (for example, a name, an e-mail address, or an account) regarding the user who actually uses the virtual network may not be registered.

With this, leakage of information regarding the user who actually uses the virtual network can be prevented.

Next, the processor 28 creates and outputs entry point information (for example, a URL of the VLAN) that is information for using the VLAN and is different for each VLAN. For example, the processor 28 notifies the owner of the entry point information. The processor 28 may display the entry point information on the operation panel, may transmit the entry point information to the owner by e-mail, or may display or print a two-dimensional code representing the entry point information on the operation panel.

Here, information regarding reservation registration of the VLAN will be described referring to FIG. 3. FIG. 3 shows a management table for managing reservation registration of a VLAN.

In the management table, for example, VLAN-ID allocated to registration (for example, conference) of a reservation, information indicating a title of a conference, information (for example, the name) for identifying an owner, an e-mail address of the owner, information indicating date on which the VLAN is used, information indicating a start time of the use, information indicating an end time of the use, the number of participants of the conference (that is, the number of users scheduled to use the VLAN), and information indicating propriety of using the functions of the multifunction machine 10 are associated with one another.

Description will be provided in connection with a specific example where VLAN-1 is associated with a conference having a conference title "VLAN conference", the conference is reserved by an owner A, the date of use is "Feb. 2, 2020, a start time of the use is "10:00", an end time of the use is "12:00", and the number of users scheduled to participate in the conference is "three persons". The number of participants is an upper limit number of the number of users who can use VLAN-1. That is, up to three persons can use VLAN-1, and a fourth user cannot use VLAN-1. For example, only three users can use VLAN-1 simultaneously on a first-come-first-served basis. A print function, a scan function, a facsimile function, and a data storage function in an HDD are allocated to VLAN-1. For example, the processor 28 of the multifunction machine 10 allocates such functions to VLAN-1 in compliance with an instruction of the owner at the time of registration of a reservation of VLAN-1. With this, the participants are permitted to use the print function, the scan function, the facsimile function, and the storage function of data in the HDD (hard disk drive) as the functions of the multifunction machine 10 through VLAN-1.

The same applies to other registration. In regard to VLAN-2, the print function and the facsimile function are not permitted to be used through VLAN-2, and the scan function and the storage function of data in the HDD are permitted to be used.

Furthermore, in regard to VLAN-3, only monochrome print in the print function is permitted, and color print is not permitted. That is, while monochrome print is permitted to be performed through is VLAN-3, color print is not permitted to be performed. Even in the facsimile function, only a function of monochrome is permitted.

The participant (that is, the user other than the owner) of the conference obtains the entry point information of the VLAN from the owner. For example, the participant may obtain the entry point information by selecting a conference name from a site of the Web service or the operation panel provided by the multifunction machine 10, or may obtain the entry point information from the owner by e-mail, Social Networking Service (SNS), or the like, or may obtain the sheet, on which the two-dimensional code representing the entry point information is printed, from the owner. The participant of the conference may be a user who uses the VLAN temporarily or may be a user who uses the VLAN continuously, not temporarily. All users obtain the entry point information and can use the VLAN indicated in the entry point information.

Figure 4:
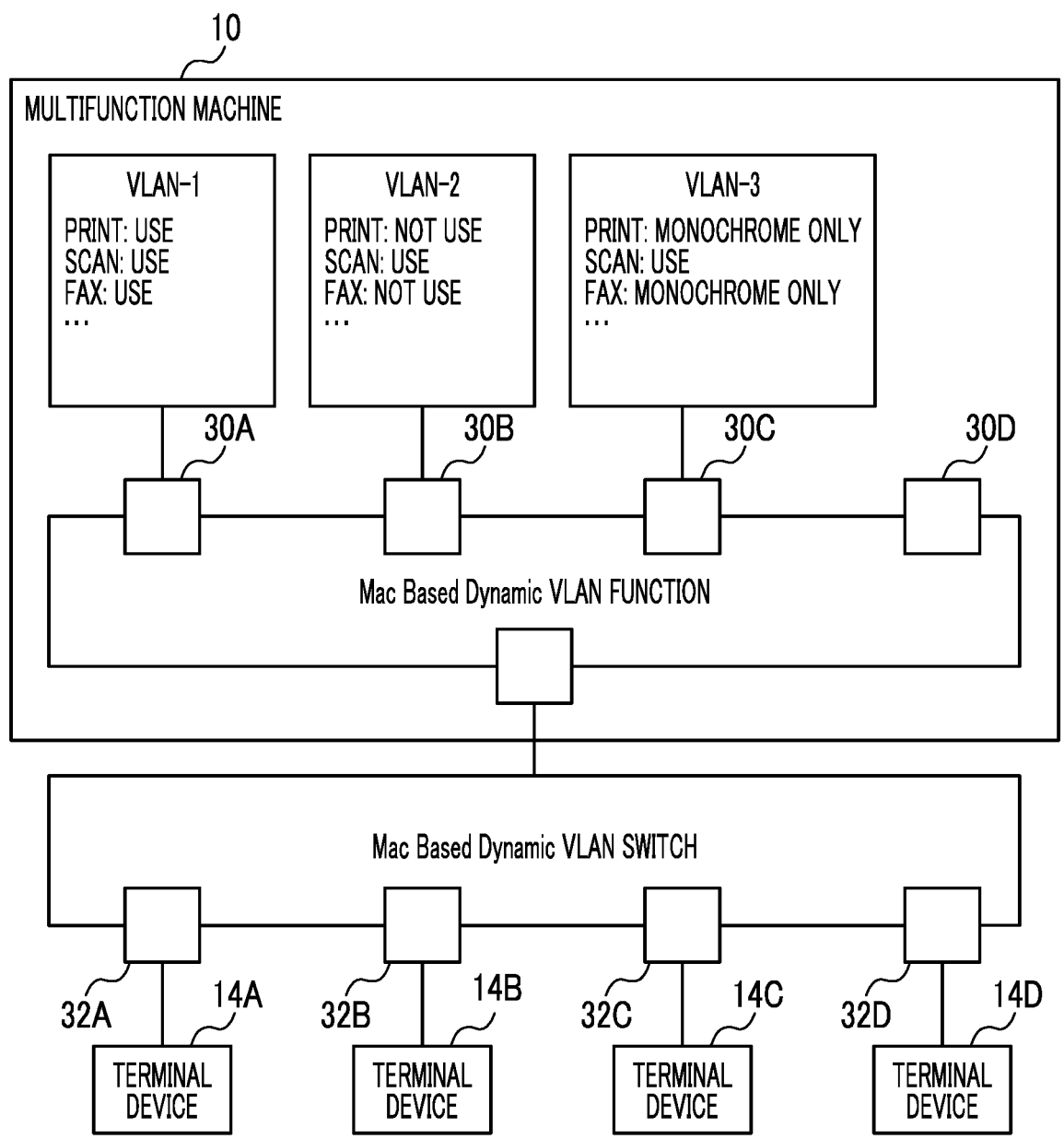
FIG. 4 is a diagram showing allocation of the virtual network and a function.

Hereinafter, a flow of processing when the user uses the VLAN will be described referring to FIG. 4. FIG. 4 shows virtual networks and allocation of the functions of the multifunction machine 10. The content of the allocation is the same as the content shown in FIG. 3.

For example, the user who is the participant of the conference accesses the site of the Web service described in the entry point information using the terminal device 14A of the user. For example, a URL (for example, https://www.MFP.com//VLAN1) of a site for connection to VLAN-1 is described in the entry point information, and the terminal device 14A accesses the URL. For example, the terminal device 14A accesses the URL through a port 32A of a VLAN switch and a common port 30D.

The processor 28 of the multifunction machine 10 registers a MAC address of the terminal device 14A, which accesses the above-described URL, in the management table and notifies the terminal device 14A of VLAN-ID (for example, VLAN-1). With this, the terminal device 14A can use VLAN-1. For example, the terminal device 14A uses VLAN-1 through the port 32A and a port 30A for VLAN-1. Furthermore, the processor 28 of the multifunction machine 10 provides the print function, the scan function, the facsimile function, and the data storage function in the HDD of the multifunction machine 10 to the terminal device 14A connected to VLAN-1. With this, the user of the terminal device 14A can use the print function, the scan function, the facsimile function, and the data storage function in the HDD of the multifunction machine 10 through VLAN-1. For example, the processor 28 executes the print function with reception of an instruction for print from the terminal device 14A connected to VLAN-1. VLAN-1 is logically separated from other VLANs (for example, VLAN-2, VLAN-3), and thus, a print job, image data, and the like transmitted through VLAN-1 is logically prevented from being transmitted to other VLANs. The processor 28 may notify the terminal device 14A connected to VLAN-1 of the functions of the multifunction machine 10 capable of being used through VLAN-1. For example, the processor 28 transmits information indicating the functions of the multifunction machine 10 capable of being used through VLAN-1 to the terminal device 14A connected to VLAN-1. The information is displayed on the display of the terminal device 14A.

In a case where the terminal device 14B accesses the site described in entry point information different from the entry point information given to the terminal device 14A, VLAN-ID different from VLAN-ID allocated to the terminal device 14A is allocated to the terminal device 14B. For example, VLAN-2 is allocated to the terminal device 14B, and the terminal device 14B can use VLAN-2. The terminal device 14B uses VLAN-2 through a port 32B and a port 30B for VLAN-2. The processor 28 of the multifunction machine 10 provides the scan function and the data storage function in the HDD of the multifunction machine 10 to the terminal device 14B connected to VLAN-2. With this, the user of the terminal device 14B can use the scan function and the data storage function in the HDD of the multifunction machine 10 through VLAN-2. For example, the processor 28 transmits image data generated by executing scan to the terminal device 14B through VLAN-2. VLAN-2 is logically separated from other VLANs (for example, VLAN-1, VLAN-3), and thus, image data transmitted through VLAN-2 is logically prevented from being transmitted to other VLANs. The print function is not allocated to VLAN-2, the processor 28 does not receive an instruction for print from the terminal device 14B connected to VLAN-2 and does not execute the print function. The processor 28 may transmit information indicating the functions of the multifunction machine 10 capable of being used through VLAN-2 to the terminal device 14B connected to VLAN-2.

In a case where the terminal device 14C accesses the site described in the same entry point information as the entry point information given to the terminal device 14A, like the terminal device 14A, VLAN-1 is allocated to the terminal device 14C. With this, the terminal device 14C can use VLAN-1. For example, the terminal device 14C uses VLAN-1 through a port 32C and the port 30A for VLAN-1. The processor 28 of the multifunction machine 10 provides the print function, the scan function, the facsimile function, and the data storage function in the HDD of the multifunction machine 10 to the terminal device 14C connected to VLAN-1. With this, the user of the terminal device 14C can use the print function, the scan function, the facsimile function, and the data storage function in the HDD of the multifunction machine 10 through VLAN-1. The processor 28 may transmit information indicating the functions of the multifunction machine 10 capable of being used through VLAN-1 to the terminal device 14C connected to VLAN-1.

In a case where the terminal device 14D accesses a site described in entry point information different from the entry point information given to the terminal devices 14A, 14B, and 14C, VLAN-ID not allocated to the terminal devices 14A, 14B, and 14C is allocated to the terminal device 14D. For example, VLAN-3 is allocated to the terminal device 14D, and the terminal device 14D can use VLAN-3. The terminal device 14D uses VLAN-3 through a port 32D and a port 30C for VLAN-3. The processor 28 of the multifunction machine 10 provides the print function (monochrome print only), the scan function, the facsimile function (monochrome facsimile only), and the data storage function in the HDD of the multifunction machine 10 to the terminal device 14D connected to VLAN-3. With this, the user of the terminal device 14D can use the print function (monochrome print only), the scan function, the facsimile function (monochrome facsimile only), and the data storage function in the HDD of the multifunction machine 10 through VLAN-3. For example, the processor 28 executes the monochrome print function with reception of an instruction for monochrome print from the terminal device 14D connected to VLAN-3. On the other hand, the color print function is not allocated to VLAN-3, and thus, the processor 28 does not receive an instruction for color print from the terminal device 14D connected to VLAN-3 and does not execute the color print function. The processor 28 may transmit information indicating the functions of the multifunction machine 10 capable of being used through VLAN-3 to the terminal device 14D connected to VLAN-3.

As described above, the separated VLAN can be used for each registration of the reservation of the VLAN (for example, for each conference). Furthermore, each VLAN is allocated with the functions to be independently provided through the VLAN, and the user can use the functions allocated to the VLAN through the VLAN.

The processor 28 of the multifunction machine 10 may permit other devices (for example, the terminal devices 14A, 14B, 14C, 14D, and the like) to use the VLAN only in a predetermined period. For example, the processor 28 permits other devices to use the VLAN only in a period between the "start time" and the end time" registered in the management table shown in FIG. 3. Description will be described in connection with a specific example. The "start time" of VLAN-1 is 10:00, and the "end time" of VLAN-1 is 12:00, and thus, the processor 28 permits other devices to use VLAN-1 only in a period of 10:00 to 12:00. The processor 28 may delete the registration of the VLAN from the management table after the end time of the VLAN has elapsed.

The processor 28 of the multifunction machine 10 may form a storage area in the memory 26 separately for each VLAN and may store information in the storage area separately for each VLAN. For example, the processor 28 forms a storage area dedicated to VLAN-1, a storage area dedicated to VLAN-2, and a storage area dedicated to VLAN-3 separately in the memory 26. Each dedicated storage area may be a physically separate storage area. As another example, each partition or path may be allocated to each dedicated storage area. As still another example, each dedicated storage area may be encrypted by a separate encryption key. For example, while the user who is permitted to use VLAN-1 is permitted to access the dedicated storage area associated with VLAN-1, the user who is not permitted to use VLAN-1 is not permitted to access the dedicated storage area associated with VLAN-1. Specifically, while the user who is permitted to use VLAN-1 is permitted to view, acquire, or use data, such as image data or document data, stored in VLAN-1, the user who is not permitted to use VLAN-1 is not permitted to view, acquire, or use data stored in VLAN-1.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a memory;
a hardware processor coupled to the memory and configured to form a virtual network, to which a function of the image processing device is allocated,
register a conference in the virtual network,
register a reservation of a user for the conference in the virtual network in the memory,
notify another device connected to the virtual network of the function of the image processing device, wherein the function of the image processing device is capable of being used through the virtual network, and
provide the function to another device connected to the virtual network, wherein information regarding the user is not registered at the time of the hardware processor registers the reservation of the user of the conference in the virtual network in the memory.

2. The image processing device according to claim 1, wherein the hardware processor is configured to
form a plurality of virtual networks, and
allocate, to each virtual network among the plurality of virtual networks, a function to be independently provided through the virtual network.

3. The image processing device according to claim 2, wherein the hardware processor is further configured to output information that is provided for using the virtual network and is different for each virtual network of the plurality of virtual networks.

4. The image processing device according to claim 1, wherein the hardware processor is further configured to permit the another device to use the virtual network only in a predetermined period.

5. The image processing device according to claim 2, wherein the hardware processor is further configured to permit the another device to use the virtual network only in a predetermined period.

6. The image processing device according to claim 3, wherein the hardware processor is further configured to permit the another device to use the virtual network only in a predetermined period.

7. The image processing device according to claim 1, wherein the hardware processor is further configured to
form a plurality of virtual networks,
form a storage area in the memory separately for each virtual network among the plurality of virtual networks, and
store information in the storage area separately for each virtual network among the plurality of virtual networks.

8. The image processing device according to claim 2, wherein the hardware processor is further configured to
form a plurality of virtual networks,
form a storage area in the memory separately for each virtual network among the plurality of virtual networks, and store information in the storage area separately for each virtual network among the plurality of virtual networks.

9. The image processing device according to claim 3,
wherein the hardware processor is further configured to
form a plurality of virtual networks,
form a storage area in the memory separately for each virtual network among the plurality of virtual networks, and
store information in the storage area separately for each virtual network among the plurality of virtual networks.

10. The image processing device according to claim 4,
wherein the hardware processor is further configured to
form a plurality of virtual networks,
form a storage area in the memory separately for each virtual network among the plurality of virtual networks, and
store information in the storage area separately for each virtual network among the plurality of virtual networks.

11. A non-transitory computer readable medium storing a program causing a computer mounted in an image processing device comprising a memory and a processor to execute a process, the process comprising:
forming a virtual network, to which a function of the image processing device is allocated,
registering a conference in the virtual network,
registering a reservation of a user for the conference in the virtual network in the memory,
notifying another device connected to the virtual network of the function of the image processing device, wherein the function of the image processing device is capable of being used through the virtual network, and
providing the function to another device connected to the virtual network, wherein information regarding the user is not registered at the time of the processor registers the reservation of the user of the conference in the virtual network in the memory.

* * * * *